United States Patent [19]

Kotani et al.

[11] Patent Number: 5,429,855
[45] Date of Patent: Jul. 4, 1995

[54] BIAXIALLY ORIENTED LAMINATED POLYESTER FILM FOR MAGNETIC RECORDING MEDIA

[75] Inventors: Tomoyuki Kotani, Tokyo; Kazuo Endo, Yokohama, both of Japan

[73] Assignee: Diafoil Hoescht Company, Limited, Tokyo, Japan

[21] Appl. No.: 51,904

[22] Filed: Apr. 27, 1993

[30] Foreign Application Priority Data

Apr. 30, 1992 [JP] Japan .................................. 4-111823

[51] Int. Cl.⁶ .................... B32B 5/16; B32B 27/06; B32B 27/36; G11B 5/704
[52] U.S. Cl. ...................... 428/141; 428/143; 428/212; 428/213; 428/323; 428/328; 428/329; 428/330; 428/331; 428/694 ST; 428/694 SL; 428/694 SG; 428/910; 428/335; 428/336; 428/480
[58] Field of Search ............. 428/141, 323, 480, 910, 428/143, 148, 149, 483, 328, 329, 330, 331, 694 ST, 694 SG, 213, 337, 334, 339, 594 SL, 212, 336, 335

[56] References Cited

U.S. PATENT DOCUMENTS

| | | | |
|---|---|---|---|
| 4,375,494 | 3/1983 | Stokes | 428/323 |
| 4,568,616 | 2/1986 | Seifried et al. | 428/480 |
| 4,606,976 | 8/1986 | Hensel et al. | 428/480 |
| 4,687,700 | 8/1987 | Hensel et al. | 428/213 |
| 4,727,108 | 2/1988 | Kagiyama et al. | 524/423 |
| 4,798,759 | 1/1989 | Dallman et al. | 428/220 |
| 4,865,898 | 9/1989 | Fukuda et al. | 428/141 |
| 5,006,589 | 4/1991 | Sakamoto et al. | 524/430 |
| 5,069,962 | 12/1991 | Okazaki et al. | 428/323 |
| 5,164,439 | 11/1992 | Sakamoto et al. | 524/425 |
| 5,188,891 | 2/1993 | Takeda et al. | 428/323 |
| 5,196,472 | 3/1993 | Kimura et al. | 524/425 |

FOREIGN PATENT DOCUMENTS

| | | |
|---|---|---|
| 0432724 | 6/1991 | European Pat. Off. . |
| 59-694425 | 4/1984 | Japan . |
| 59-217755 | 12/1984 | Japan . |
| 62-207356 | 9/1987 | Japan . |
| 1-16856 | 3/1989 | Japan . |
| 1-306220 | 12/1989 | Japan . |
| 3-1941 | 1/1991 | Japan . |
| 4-65239 | 3/1992 | Japan . |
| 4-105935 | 4/1992 | Japan . |

OTHER PUBLICATIONS

Patent Abstract, Derwent Publications Ltd., No. 88-031 987 (JP-62-290 535). Dec. 1987.
Patent Abstract, Derwent Publications Ltd., No. 92-170 812 (JP-04-106 716). Apr. 1992.
Patent Abstract, Derwent Publications Ltd., No. 89-283 002 (JP-01-208 132). Aug. 1989.

*Primary Examiner*—Stevan A. Resan
*Assistant Examiner*—Vivian Chen
*Attorney, Agent, or Firm*—Foley & Lardner

[57] ABSTRACT

A biaxially oriented laminated polyester film for magnetic recording media, which has excellent surface uniformity, slittability, running property and cost performance, and in which a magnetic tape produced therefrom shows a very small number of scratches and a very small amount of abrasion dust.

7 Claims, No Drawings

BIAXIALLY ORIENTED LAMINATED POLYESTER FILM FOR MAGNETIC RECORDING MEDIA

BACKGROUND OF THE INVENTION

The present invention relates to a biaxially oriented laminated polyester film for magnetic recording media and, more particularly, it relates to a biaxially oriented laminated polyester film for magnetic recording media, which has excellent surface uniformity, slittability, running property and cost performance, and in which a magnetic tape produced therefrom shows a very small number of scratches and a very small amount of abrasion dust.

Biaxially oriented polyester films are widely used as industrial materials. With the recent demand for higher-grade polyesters, especially, for magnetic recording media, they are strongly required to have uniform surfaces. The abrasion property of polyester films cannot be said satisfactory, which is are represented by a scraped surface layer due to the wear of a film or drop-off of the particles from the surface. For example, when such a polyester film is used as a base film of a video tape, the tape is apt to meander when running. The improvement of these properties is strongly demanded and, especially, polyester films for high-density magnetic recording media are required to fully satisfy these demands.

As a means for improving the abrasion resistance and the running property of a polyester film, there has been known a method of making the film surface appropriately rough by mixing inert fine particles with the film. By this method, these properties are improved to some extent but cannot always be said to be satisfactory.

For example, in case of using as the fine particles, the so-called deposited particles which are produced from the residue of a catalyst after the production of a polyester, the fine particles are easily broken when the film is stretched, so that the abrasion resistance and the running property of the film are insufficient and the reuse of the deposited particles is difficult.

In case of adding inorganic compound particles inert to polyesters, such as silicon oxide, barium sulfate, titanium dioxide and calcium phosphate to a polyester film, these particles are not broken or deformed when the film is stretched, and endow comparatively sharp protuberances for the film surface, thereby improving the running property of the film. However, since the particle size distribution of these particles is generally wide and the particles easily drop from the film surface, when the film is used for a magnetic recording medium, they often cause the deterioration of the electromagnetic conversion property (signal recording property) and a large number of dropouts.

To solve these problems, a method of using inorganic or organic particles having a sharp particle size distribution has been proposed. For example, Japanese Patent Application Laid-Open (KOKAI) No. 62-207356 (1987) discloses a method of using monodisperse silicon oxide particles, and Japanese Patent Application Laid-Open (KOKAI) No. 59-217755 (1984) discloses a method of using organic crosslinking particles obtained by emulsion polymerization. In the case of using silicon oxide particles, however, since the hardness of the particles is high, a silicon particles-containing film is apt to damage the base material which is in contact with the film, and the improvement of the abrasion resistance is insufficient. On the other hand, in the case of using organic crosslinking particles, not only the heat resistance is insufficient but also the particles are easily deformed when the film is stretched. In addition, since monodisperse particles are comparatively expensive, the film containing a large amount of monodisperse particles is very disadvantageous in the point of view of cost.

As a way for solving the problem in the abrasion resistance, a method of adding particles having a high Mohs hardness such as aluminum oxide particles to a base film has been proposed (e.g., Japanese Patent Application Laid-Open (KOKAI) No. 1-306220 (1989). In this method, however, it is necessary to add a large amount of aluminum oxide particles to a base film in order to sufficiently prevent the production of scratches or abrasion dust on the magnetic tape, resulting in the following problems.

(1) Since aluminum oxide particles are comparatively expensive, the film containing a large amount of monodisperse particles is very disadvantageous from the view-point of cost.

(2) In the film formation process and in the magnetic tape production process, the cutting blade is so greatly damaged at the slitting step that frequent change of cutting blades is necessary, thereby increasing the manufacturing cost and reducing the productivity. If the cutting blades are not changed frequently at the slitting step when a magnetic tape is produced, the slitting property of the magnetic tape is deteriorated. Such deterioration of the slitting property causes that the cut face is sometimes turned up in the shape of streaks and, in some cases, cuttings are drop off the cut face. Furthermore, abrasion dust may drop off the magnetic layer, thereby inducing dropouts.

The following polyester films have been also proposed.

Japanese Patent Application Laid-Open (KOKAI) No. 3-1941 (1991) proposes a laminated polyester film having at least one outermost layer composed of a polyester layer containing 0.01 to 5 wt % of inorganic particles having an average particle diameter of not more than 5 $\mu$m and a Mohs hardness of not less than 8.

Japanese Patent Application Laid-Open (KOKAI) No. 4-65239 (1992) proposes a biaxially oriented laminated polyester film comprising a base film and outer layers disposed on both surfaces of the film, wherein at least one outermost layer contains 0.01 to 2.0 wt % of inorganic particles having a Mohs hardness of 2 to 5, an average particle diameter ($d_A$) of 0.1 to 2.0 $\mu$m, and the thickness ($t_1$) of the outermost layer satisfies the following expression.

$$0.20\ d_A \leq t_1 \leq 5.0\ d_A$$

Japanese Patent Application Laid-Open (KOKAI) No. 4-105935 (1992) proposes a biaxially oriented laminated thermoplastic resin film comprising a film (layer B) containing a thermoplastic resin B as the main ingredient, and a film (layer A) disposed on at least one side of the layer B and containing a thermoplastic resin A as the main ingredient, wherein the thickness of the layer A is 0.01 to 3 $\mu$m, and the thermoplastic resin A contains 0.1 to 20 wt % of spherical calcium carbonate particles having an average particle diameter of 0.2 to 5 times as large as the thickness of the layer A.

However, there is no end to the demand for improved polyester films, and a biaxially oriented laminated film which shows a very small number of scratches and a very small amount of abrasion dust, which has a more excellent running property when manufactured into a magnetic tape, and which has improved slittability at the time of film formation is demanded.

As a result of various studies undertaken by the present inventors so as to solve the above-described problems, it has been found that by laminating a polyester layer (B) on a polyester layer (A) containing inorganic particles (a) having a Mohs hardness of not less than 7 and an average particle diameter of 0.005 to 0.5 μm, and inorganic particles (b) having a Mohs hardness of less than 7, a particle-size distribution of not more than 2.00, an aspect ratio (major axial diameter/minor axial diameter) of 1.0 to 2.0, a specific surface area of 1.6 to 40 m$^2$/g, an average particle diameter of 0.05 to 1.0 μm, the product of the specific surface area and the average particle diameter of 2.4 to 7.0, wherein the content of the inorganic particles (a) is 0.15 to 1.0 wt % based on the polyester content in the layer (A) and not more than 0.10 wt % based on the total polyester content in the layers (A) and (B), and the content of the inorganic particles (b) is 0.10 to 2.0 wt % based on the polyester content in the layer (A) and not more than 0.4 wt % based on the total polyester content in the layers (A) and (B), the obtained biaxially oriented laminated film having a three-dimensional center-line average roughness of the layer (A) of 0.005 to 0.045 μm, the quotient of the three-dimensional center-line average roughness of the layer (A) thereof by the three-dimensional 10-point average roughness of the surface of the layer (A) of 4 to 13, a three-dimensional center-line average roughness of the layer (B) of 0.002 to 0.020 μm, the quotient of the three-dimensional center-line average roughness of the layer (A) by the three-dimensional center-line average roughness of the layer (B) of 1.1 to 4.0, and an improved slittability at the time of film formation, and showing a very small number of scratches, a very small amount of abrasion dust and having a more excellent running property than that of a conventional one when manufactured into a magnetic tape. On the basis of this finding, the present invention has been achieved.

SUMMARY OF THE INVENTION

It is an object of the present invention to provide a biaxially oriented laminated film which shows a very small number of scratches and a very small amount of abrasion dust, which has a more excellent running property when manufactured into a magnetic tape, and which has improved slittability at the time of film formation.

To achieve this object, in an aspect of the present invention, there is provided a biaxially oriented laminated polyester film for magnetic recording media comprising a polyester layer (A) containing inorganic particles (a) having a Mobs hardness of not less than 7 and an average particle diameter of 0.005 to 0.5 μm and inorganic particles (b) having a Mohs hardness of less than 7, a particle-size distribution ($d_{25}/d_{75}$) of not more than 2.00, an aspect ratio (major axial diameter/minor axial diameter) of 1.0 to 2.0, a specific surface area (S) of 1.6 to 40 m$^2$/g and an average particle diameter ($d_{50}$) of 0.05 to 1.0 μm and the product ($S \times d_{50}$) of the specific surface area and the average particle diameter of 2.4 to 7.0, and a polyester layer (B) laminated on the polyester layer (A), the content of the inorganic particles (a) being 0.15 to 1.0 wt % based on the polyester content in the layer (A) and not more than 0.10 wt % based on the total polyester content in the layers (A) and (B), the content of the inorganic particles (b) being 0.10 to 2.0 wt % based on the polyester content in the layer (A) and not more than 0.4 wt % based on the total polyester content in the layers (A) and (B), and the biaxially oriented laminated film satisfying the following expressions (1) to (4):

$$0.005 \leq SRa^A \leq 0.045 \tag{1}$$

$$4 \leq SRz^A/SRa^A \leq 13 \tag{2}$$

$$0.002 \leq SRa^B \leq 0.020 \tag{3}$$

$$1.1 \leq SRa^A/SRa^B \leq 4.0 \tag{4}$$

wherein $SRa^A$ represents the three-dimensional center-line average roughness (μm) of the layer (A), $SRz^A$ represents the three-dimensional 10-point average roughness (μm) of the surface of the layer (A), and $SRa^B$ represents the three-dimensional center-line average roughness (μm) of the layer (B).

DETAILED DESCRIPTION OF THE INVENTION

The laminated polyester film in the present invention is produced by stretching and heat-treating amorphous laminated sheet obtained by, for example, simultaneously melt-extruding each layer from a die of an extruding machine, namely, so-called coextrusion. Although a coextruded two-layered film will be explained in the following, the laminated polyester film is not restricted thereto and it may be a coextruded three-or more-layered film or a film produced by another method so far as it is not beyond the scope of the invention.

The polyester which constitutes each layer of the laminated film of the present invention is a polyester which is obtained from an aromatic dicarboxylic acid or an ester thereof and a glycol as the main starting materials, and in which not less than 80% of the repeating structural units thereof are ethylene terephthalate units or ethylene-2, 6-naphthalate units. Another component may be contained as far as no deviation of the above-mentioned range.

As the aromatic dicarboxylic acid component, isophthalic acid, phthalic acid, adipic acid, sebacic acid, an oxycarboxylic acid (e.g., p-oxyethoxybenzoic acid), etc. are usable as well as terephthalic acid and 2,6-naphthalene dicarboxylic acid. As the glycol component, at least one selected from the group consisting of diethylene glycol, propylene glycol, butanediol, 1,4-cyclohexanedimethanol and neopentyl glycol is usable as well as ethylene glycol.

A stabilizer, a coloring agent, an antistatic agent, etc. may be appropriately added to the polyester constituting each layer, or a polyester treated with such an agent may be used for each layer without any problem if it satisfies the necessary conditions of the present invention.

As the polycondensation reaction catalyst for the polyester, a generally used catalyst such as Sb, Ti, Ge, Sn and Si compounds is used.

In the following explanation, the exposed surface (smooth surface) of the polyester layer (B) will be referred to as a surface B and the exposed surface (slippery surface) of the polyester layer (A) will be referred to as a surface A.

When the film of the present invention is used as a base film for a magnetic tape, a magnetic layer is generally applied to the surface B of the film. The layer (B) of the present invention may be composed of a multi-layered film if only the following necessary conditions are satisfied, and a layer of substantially no particles, for example, may be incorporated thereinto an inner layer of the film of the present invention.

The three-dimensional center-line average roughness ($SRa^B$) of the surface (B) of the film of the present invention is 0.002 to 0.020 μm, preferably 0.008 to 0.015 μm, more preferably 0.010 to 0.015 μm. If the $SRa^B$ is less than 0.002 μm, the slipperiness of the base film is not good, so that scratches are often produced on the base film, especially, during the process of production of a magnetic tape layer, and the electromagnetic conversion property (signal recording property) and the handling property of the magnetic tape are sometimes deteriorated. When the $SRa^B$ exceeds 0.020 μm, the electromagnetic conversion property (signal recording property) of the magnetic tape is also sometimes deteriorated. These films are, therefore, unsuitable for a magnetic tape.

One of the important features of the present invention lies in that the magnetic tape has an excellent running property when the film of the present invention is used as a base film of the magnetic tape. As a result of studies undertaken by the present inventors so as to improve the running property, it has been found that there is a close relationship between the three-dimensional surface roughness and the running property of a film. That is, if the three-dimensional surface roughness of the surface (A), which is generally the opposite surface to the magnetic layer, satisfies a specific relationship, the improvement of the running property is possible without impairing the abrasion resistance, the electromagnetic conversion property, etc.

The $SRa^A$ of the surface (A) of the film of the present invention is 0.005 to 0.045 μm, preferably 0.007 to 0.030 μm, more preferably 0.010 to 0.025 μm, most preferably 0.010 to 0.020 μm. If the $SRa^A$ value is less than 0.005 μm, the running property and the abrasion resistance of the film are sometimes deteriorated. On the other hand, if the $SRa^A$ exceeds 0.045 μm, the electromagnetic conversion property (signal recording property) of the magnetic tape is sometimes deteriorated due to the transference of the shapes of the coarse protuberances to the magnetic layer produced on the film (back-side transfer phenomenon). These films are, therefore, unsuitable for a magnetic tape.

On the surface (A) of the film of the present invention, the $SRz^A/SRa^A$ is 4 to 13, preferably 5 to 10, more preferably 5 to 9. If the $SRz^A/SRa^A$ is less than 4, the running property and the abrasion resistance of the film are sometimes deteriorated. On the other hand, if the $SRz^A/SRa^A$ exceeds 13, the coarse protuberances of the base film are so many that the shapes of the coarse protuberances are transferred to the magnetic layer produced on the film, thereby not only deteriorating the electromagnetic conversion property (signal recording property) of the magnetic tape but also making it impossible to sufficiently improve the running property of the film. These films are, therefore, unsuitable for a magnetic tape.

The ratio ($SRa^A/SRa^B$) of the $SRa^A$ of the surface (A) and the $SRa^B$ of the surface (B) of the film of the present invention is 1.1 to 4.0, preferably 1.1 to 3.0, more preferably 1.5 to 2.5. If the ratio is less than 1.1, the slittability improving effect brought about by laminating the film is reduced. On the other hand, if the ratio exceeds 4.0, the electromagnetic conversion property (signal recording property) or the running property is sometimes deteriorated.

On the surface (A) of the film of the present invention, the number of coarse protuberances having a height of not less than 1.08 μm is preferably not more than 100, more preferably not more than 50, most preferably not more than 30 per 25 cm². If the number of coarse protuberances having a height of not less than 1.08 μm exceeds 100 per 25 cm², the shapes of the coarse protuberances are transferred to the magnetic layer, so that the number of dropouts is apt to increase.

The film of the present invention includes a specified amount of specific particles (a) and (b).

The particles (a) used for the film of the present invention will first be explained. The particles (a) are inorganic particles having a Mohs hardness of not less than 7 and an average particle diameter of 0.005 to 0.5 μm. The presence of the particles (a) in the layer (A) of the film greatly enhances the scuff resistance (durability) and abrasion resistance of the magnetic tape produced from this film. If the average particle diameter is more than 0.05 μm, coarse protuberances are produced due to agglomeration, thereby deteriorating the electromagnetic conversion property (signal recording property) of the magnetic tape produced from the film and increasing the number of dropouts. On the other hand, if the average particle diameter is less than 0.005 μm, the scuff resistance improving effect is reduced. The average particle diameter of the particles (a) is preferably 0.005 to 0.3 μm, more preferably 0.005 to 0.1 μm.

Examples of inorganic particles having a Mohs hardness of not less than 7 are particles of aluminum oxide, silicon carbide, vanadium carbide, titanium carbide, boron carbide, tungsten boride and boron nitride. Among these, aluminum oxide particles which are industrially easily available are preferably used. Two kinds or more of inorganic particles having a Mohs hardness of not less than 7 may be used in the form of a mixture.

The crystal form of aluminum oxide particles is not specified, but delta, theta or gamma aluminum oxide particles are preferable. Delta aluminum oxide particles are more preferably used. These particles are produced, for example, by thermal decomposition method, namely, flame hydrolysis method of using anhydrous aluminum chloride used as a starting material or by ammonium alum thermal decomposition method, namely, a method of reacting aluminum hydroxide with sulfuric acid, and reacting the aluminum sulfate produced with ammonium sulfate to obtain ammonium alum. The primary particle diameters of the aluminum oxide particles obtained by these methods are generally in the range of 5 to 40 nm, but since the particles often form aggregates having a particle diameter of more than 0.5 μm, it is preferable to appropriately pulverize the aggregates before use. In this case, the particles may contain secondary particles but, the apparent average particle diameter is not more than 0.5 μm, preferably not more than 0.3 μm, more preferably not more than 0.1 μm.

The content of the particles (a) based on the polyester content in the layer (A) is 0.15 to 1.0 wt %. If the content of the particles (a) is less than 0.15 wt % the scuff resistance and abrasion resistance improving effect of the particles (a) is insufficient. On the other hand, if the content exceeds 1 wt % coarse protuberances are produced on the film, which invites the deterioration of the electromagnetic conversion property (signal recording property) and the increase of the number of dropouts. The content of the particles (a) based on the polyester content in the layer (A) is preferably 0.15 to 0.5 wt %, more preferably 0.15 to 0.30 wt %.

The content of the particles (a) based on the total polyester content in the layers (A) and (B) is not more than 0.10 wt %, preferably not more than 0.075 wt %. If the content exceeds 0.10 wt %, since the cutting blade is so greatly damaged at the slitting step in the formation of a film and the production of a magnetic tape, frequent change of cutting blades in their steps is necessary, thereby reducing the productivity.

The particles (b) used for the film of the present invention will now be explained. The particles (b) are inorganic particles having a Mohs hardness of less than 7 and an average particle diameter ($d_{50}$) of 0.05 to 1.0 μm. The presence of the particles (b) in the layers (A) and (B) of the film greatly enhances the scuff resistance and abrasion resistance of the magnetic tape produced from this film. The average particle diameter of the particles (b) is preferably 0.10 to 0.70 μm, more preferably 0.15 to 0.40 μm, most preferably 0.15 to 0.24 μm. If the average particle diameter is less than 0.05 μm, the running property and the abrasion resistance are hardly improved. On the other hand, if the average particle diameter exceeds 1.00 μm, the surface roughness of the film is so high as to impair the electromagnetic conversion property (signal recording property), and the running property of the magnetic tape produced from the film is hardly improved. These films are, therefore, unsuitable for a magnetic tape.

In the particles (b), the particle-size distribution ($d_{25}/d_{75}$) is not more than 2.00, the aspect ratio (major axial diameter/minor axial diameter) is 1.0 to 2.0, the specific surface area (S) is 1.6 to 40 m²/g and the product ($S \times d_{50}$) of the average particle diameter and the specific surface area is 2.4 to 7.0.

The content of the particles (b) based on the polyester content in the layer (A) is 0.10 to 2.0 wt %, preferably 0.2 to 1.8 wt %, more preferably 0.5 to 1.7 wt % most preferably 0.75 to 1.5 wt %. If the content of the particles (b) is less than 0.10 wt %, not only the slipperiness of the magnetic tape produced from this film is unfavorable but also the running property is sometimes deteriorated. On the other hand, if the content exceeds 2 wt % the shapes of the coarse protuberances are transferred to the magnetic layer produced on the film, which sometimes invites the deterioration of the electromagnetic conversion property of the magnetic tape produced from this film.

The content of the particles (b) based on the total polyester content in the layers (A) and (B) is not more than 0.4 wt %, preferably not more than 0.35 wt %.

As the particles (b), additive particles are preferably used because the particle sizes and the amount of these particles are easily controlled. The "additive particles" here means particles externally added. Examples of the additive particles are particles of calcium carbonate, kaolin, talc, carbon black, molybdenum sulfide, gypsum, barium sulfate, lithium fluoride, calcium fluoride, zeolite, calcium phosphate, silicon dioxide and titanium dioxide. Among these, synthetic calcium carbonate particles are preferably used because they have a remarkable running property and abrasion resistance improving effect.

In the production of a polyester containing the specific additive particles in the present invention, the particles may be added either during the synthesis reaction of the polyester or directly to the polyester. The additive particles may be pulverized, dispersed, classified or filtered, as occasion demands before they are added to the polyester.

As described above, synthetic calcium carbonate particles are preferably used as the particles (b) in the present invention. In order to produce a film having a surface uniformity of a high level, the particle-size distribution of synthetic calcium carbonate particles is not more than 2.00, preferably not more than 1.80, more preferably not more than 1.50. The particle-size distribution is the value defined by $d_{25}/d_{75}$, wherein $d_{25}$ and $d_{75}$ represent the particle diameters (μm) at the point of 25% of the cumulative volume and at the point of 75% of the cumulative volume when integrated from the large particle size, respectively. If the particle-size distribution exceeds 2.00, the surface roughness of the film finally obtained is apt to become nonuniform, which sometimes invites the deterioration of the electromagnetic conversion property or the withstand voltage.

As the synthetic calcium carbonate particles having the above-described properties, monodisperse vaterite-type calcium carbonate particles are usable. The BET specific surface area (S) of the vaterite-type calcium carbonate particles is 1.6 to 40.0 m²/g, preferably 2.0 to 35.0 m²/g, more preferably 2.0 to 30.0 m²/g. The polyester containing vaterite-type calcium carbonate particles having a BET specific surface area (S) of more than 40.0 m²/g is apt to produce coarse protuberances on the film produced. On the other hand, the particles having a specific surface area (S) of less than 1.6 m²/g have too large a particle size.

The product ($S \times d_{50}$) of the average particle diameter ($d_{50}$) and the BET specific surface area (S) of the vaterite-type calcium carbonate particles is 2.4 to 7.0, preferably 3.0 to 6.0. If the product ($d_{50} \times S$) exceeds 7.0, coarse protuberances are apt to be produced on the film surface.

The shape of the vaterite-type calcium carbonate particles is preferably a sphere or an ellipsoid, more preferably an ellipsoid. The aspect ratio (major axial diameter/minor axial diameter) of these particles 1.0 to 2.0, preferably 1.2 to 1.8, more preferably 1.3 to 1.8.

As a method of producing calcium carbonate particles, for example, what is called a synthesis method for producing precipitated calcium carbonate by introducing a carbon dioxide-containing gas into a calcium hydroxide solution, as described in Japanese Patent Application Laid-Open (KOKAI) No. 59-69425 (1984), is conventionally known as well as a method of pulverizing and classifying natural calcium carbonate particles. In this case, calcite-type calcium carbonate particles having a comparatively uniform particle size are obtained. A method of mixing these calcite-type calcium carbonate particles to a polyester film is known, as described in Japanese Patent Application Laid-Open (KOKAI) No. 1-16856 (1989). However, since these particles do not have the desired particle-size distribution, it is impossible to obtain a film having good properties of a high level.

In this synthesis method, by using a calcium compound as the raw material, and selecting appropriately conditions including the hydrogen ion concentration, the reaction rate, the reaction temperature and the conductivity for the carbonating reaction in a mixed medium of alcohol and water by carbon dioxide, vaterite-type calcium carbonate particles having a very sharp particle-size distribution are obtained. As the calcium compound material, calcium oxide, calcium hydroxide, metallic calcium, calcium hydride, calcium chloride, calcium iodide, calcium nitrate, etc. are usable. Among these, calcium oxide is preferable. As the alcohol, monovalent, divalent and trivalent alcohols having not more than 4 carbon atoms are usable. Examples of preferred alcohols are methyl alcohol, ethyl alcohol, propyl alcohol, butyl alcohol and glycerin. Among these, methyl alcohol is preferable. These alcohols may be used either singly or in the form of a mixture. The carbonating reaction is carried out by using carbon dioxide or a carbonate compound. The carbon dioxide used may be in the form of a solid such as dry ice as well as gas. A carbon dioxide-containing gas having a concentration of about 3.0 vol % produced when firing limestone may also be used.

A method of producing vaterite-type calcium carbonate particles preferably used in the present invention is not specified, but the following method is preferred.

5 to 20 molar equivalents, preferably 5 to 15 molar equivalents of water (calculated as quick lime) is added to a methanol suspension of quick lime and/or slaked lime having a concentration of 0.5 to 12 wt %, preferably 1 to 8 wt % (calculated as quick lime), thereby mixing methanol, quick lime and/or slaked lime and water. Gaseous carbon dioxide is then passed through the resultant mixture. The temperature of the system is raised to not lower than 30° C., preferably not lower than 40° C. before the conductivity of the carbonating reaction system reaches the maximal point of the conductivity change curve of the carbonating reaction system and the time elapsed from the initiation of the carbonating reaction to the time when the conductivity of the carbonating reaction system reaches 100 μS/cm is controlled to be less than 600 minutes, preferably not less than 120 minutes, more preferably not less than 100 minutes.

Vaterite-type calcium carbonate particles can be added in the polyester production process as they are, but they are preferably subjected to surface finishing in advance in order to reduce the solubility to the reaction system and enhance the dispersibility. As the surface-finishing agent also serving as a dispersant, surface-finishing agents such as those described in Japanese Patent Application Laid-Open (KOKAI) Nos. 59-69426 (1984), 1-256558 (1989) and 4-31319 (1992) are preferable. Especially, polycarboxylic acids and the sodium salts or ammonium salts thereof are preferable. Examples of these are unneutralized acrylic acid, methacrylic acid, maleic acid, PEG monoacrylate, butyl acrylate and cyclohexyl acrylate, and the ammonium salts and the sodium salts thereof. Addition of these surface-finishing agents in the process of producing the particles is effective.

In the film of the present invention, inert particles having a Mohs hardness of less than 7 other than the particles (a) and (b) may be added. As these inert particles, the above-described additive particles may be used and the following deposited particles may also be used. The "deposited particles" herein means the particles deposited in the reaction system when a system using an alkali metal compound or an alkali earth metal compound as an ester exchange catalyst is polymerized in an ordinary method. The particles deposited when terephthalic acid is added in ester exchange reaction or polymerization reaction may also be used. These reactions may be carried out in the presence of one or more phosphoric compounds such as phosphoric acid, trimethyl phosphate, triethyl phosphate, tributyl phosphate, acidic ethyl phosphate, phosphorus acid, trimethyl phosphite, triethyl phosphite and tributyl phosphite. In the process of esterification, inert particles can be deposited. For example, polycondensation reaction is carried out in the presence of an alkali metal compound or an alkali earth metal compound and in the presence or absence of a phosphoric compound before or after the end of esterification reaction. In any case, the deposited particles in the present invention contain at least one element such as calcium, lithium, antimony and phosphorus.

In the laminated film of the present invention, the thickness of the layer (A) is preferably 1 to 50%, more preferably 3 to 30%, most preferably 5 to 25% based on the total thickness of the film. If the thickness of the layer (A) exceeds 50% based on the total thickness, the content of the inorganic particles having a Mohs hardness of not less than 7 based on the total polyester content in the layers (A) and (B) is so high as to deteriorate the slittability. On the other hand, if the thickness of the layer (A) is less than 1% based on the total thickness, it is difficult to control the thickness of the film.

In order to reduce the material cost in the present invention, a polyester material produced at a low cost is especially preferably used for an intermediate layer of a laminated film having at least three layers. As examples of the polyesters used for the intermediate layer, reclaimed polyester, directly polymerized polyester which contains substantially no particles may be exemplified.

If the base film for a magnetic recording medium contains not less than 80 mol % of ethylene terephthalate units, the preferred refractive index of the film in the direction of thickness is not less than 1.492. If the refractive index is less than 1.492, the running property and abrasion resistance improving effect is sometimes insufficient. When the refractive index of the film in the direction of thickness is not less than 1.492, the adhesiveness between the film and the magnetic layer is favorably enhanced. The refractive index of the film in the direction of thickness is more preferably 1.494 to 1.505. The film having this physical property is obtained by raising the temperature for stretching in the machine direction in sequential biaxial stretching, for example, to about 90° to 115° C., which is 5° to 30° C. higher than the general stretching temperature.

When the difference ($\Delta n = n_{TD} - n_{MD}$) between the refractive index ($n_{TD}$) in the transverse direction and the refractive index ($n_{MD}$) in the machine direction of the film of the present invention is not less than 0.010, the film is excellent, especially, in the slitting property and suitable as a base film for a magnetic tape. The slitting property is a property observed when a magnetic tape is slit with a shear cutter or the like. If the slitting property is bad, the cut face is sometimes turned up in the shape of a streak and/or whiskers or white abrasion dust (wear debris) may be occurred from the cut face. In such cases, white abrasion dust (wear debris) adheres to the tape, thereby deteriorating the electromagnetic conversion property (signal recording property) or inducing dropouts. The difference ($\Delta n$) is preferably not less than 0.020, more preferably not less than 0.025, most preferably not less than 0.035. If the difference ($\Delta n$) is too large, disadvantages are caused in thermal shrinkage, etc., so that the upper limit of the difference ($\Delta n$) is preferably set at 0.060.

The intrinsic viscosity of the film of the present invention is preferably 0.52 to 0.62, more preferably 0.54 to 0.59. The lower the intrinsic viscosity, the better the slitting property of the film. However, if the intrinsic viscosity is less than 0.52, the film is apt to be broken during film formation. On the other hand, if the intrinsic viscosity exceeds 0.62, the slitting property improving effect is insufficient.

A method of producing the film of the present invention will now be explained. In order to produce the film of the present invention, known methods such as a coextrusion method, an extrusion lamination method and a dry lamination method are usable. Among these, the coextrusion method is preferably used from the viewpoint of productivity and quality stability. A method of producing the film by a coextrusion method will therefore be explained in the following.

Polyester materials are prepared, and after they are dried by an ordinary method, they are is extruded by different extruding machines at a temperature of 200° to 320° C. and chilled and solidified on a casting drum, thereby obtaining an amorphous film having two or more layers. At this time, an ordinary electrostatic pinning method is preferably adopted because an amorphous sheet having a uniform thickness is obtained.

The amorphous sheet is then biaxially stretched and heat-set. Generally, after the sheet is stretched to not less than 2.5 times in the machine direction at a temperature of 80° to 130° C., it is stretched to not less than 3.0 times in the transverse direction. The biaxially stretched film is then heat-treated in the temperature range of 130° to 250° C. It is naturally possible to adopt a method of sequentially or simultaneously stretching the sheet in the machine and transverse directions, restretching the resultant sheet to 1.05 to 2.5 times in the machine direction at a temperature of 110° to 180° C. and heat-setting the thus-stretched film In this case, a method of heat-setting the sheet before restretching the sheet in the machine direction, a method of relaxing the sheet after restretching the sheet, a method of stretching the sheet in the machine direction by a minute magnification before or after restretching the sheet or the like may be appropriately adopted. It is also possible to restretch the sheet in the transverse direction. The sheet may be subjected to various surface treatments and necessary, in the film forming process. It is especially preferable to move the cutting blade by several mm to several ten mm during film formation in preparation for the step of slitting the edge portion of the film after it is biaxially stretched and heat-set, because the local damage of the cutting blade is prevented thereby.

The biaxially oriented laminated polyester film of the present invention having the above-described physical properties, and comprising polyesters and the inorganic particle (a) and (b) having the above-described physical properties mixed therewith in a specified ratio shows a very small number of scratches and a very small amount of abrasion dust and has a more excellent running property than that of a conventional one when manufactured into a magnetic tape. The number of depressions caused by drop-off of particles is not more than 20/mm$^2$, preferably not more than 5/mm$^2$. In addition, the cost of the material is reduced and the slittability at the time of film formation is improved. Thus, the film of the present invention is of great industrial value.

A magnetic tape produced from the biaxially oriented laminated film of the present invention shows a very small amount of white abrasion dust, so that it hardly contaminates a calender. The electromagnetic conversion property (signal recording property) is also excellent and the number of dropouts is not more than 5/min, preferably not more than 3/min. The number of scratches produced on the surface (A) is very small, in other words, the scuff resistance is high. In addition, the running property of the tape is excellent and the slitting property is also excellent.

EXAMPLES

The present invention will be explained in more detail with reference to the following examples, but the present invention is not restricted to those examples and various modifications are possible within the scope of the invention. The definitions and the methods of measuring various physical properties and characters are as follows. "Part" in the examples and the comparative examples refer to "part by weight".

(1) Average particle diameter and particle-size distribution

The particle diameters were measured by using a centrifugal precipitation-type particle-size distribution meter (Model SA-CP3, produced by Shimazu Corporation), and the average particle diameter was calculated as the diameter at the point of 50% of the cumulative volume calculated as an equivalent sphere. The ratio [$\gamma$] of the particle diameters at the point of 25% of the cumulative volume and at the point of 75% of the cumulative volume, respectively, when the volumes of the particles were respectively integrated from the large particle size, was regarded as the index of the particle size distribution.

(2) Specific surface area (S)

The specific surface area was measured by a BET method for obtaining a specific surface area from the adsorption of nitrogen gas by using liquid nitrogen.

(3) Aspect ratio

The major axial diameters and the minor axial diameters of particles were measured by an electron microscope, and the respective average values were obtained as the major axial diameter and the minor axial diameter of the particles.

(4) Intrinsic viscosity [$\eta$]

1 g of a polymer was dissolved in 100 ml of a mixed solvent of phenol/tetrachloroethane in a weight ratio of 50:50, and the intrinsic viscosity was measured at a temperature of 30° C.

The refractive index ($n\alpha$) in the direction of thickness of the film, the refractive index ($n_{TD}$) in the transverse direction of the film, the refractive index ($n_{MD}$) in the machine direction of the film were measured by an Abbe refractometer (produced by Atago Optical Co., Ltd.). The birefrigerence ($\Delta n$) was obtained from the following formula:

$$\Delta n = n_{TD} - n_{MD}$$

Each refractive index was measured by using sodium D line.

(6) Slittability

The edge portion of the biaxially oriented and heat-set film was slit with a stainless steel cutting blade by 50000 m in the film forming process, and the degree of damage of the cutting blade was visually evaluated. The evaluation was made according to the following criterion.

A: The cutting blade was hardly damaged so that it was not necessary to replace the blade.
B: Intermediate between A and C.
C: The cutting blade was obviously damaged so that it was necessary to replace the blade.

(7) Three-dimensional surface roughness

The surface roughness were obtained by using a surface roughness measuring machine (SE - 3AK, produced by Kosaka Kenkyusho Co., Ltd. ). The radius of the stylus was 5 µm, the sampling pitch was 1.0 µm, the cut-off value was 0.25 mm, the magnification in the machine direction was 50000 or 20000 times, and the number of scanning lines was 500.

(A) Three-dimensional center-line average roughness (SRa)

A portion having an area ($S_M$) was cut out of the center line of a roughness curved line. An orthogonal coordinate system of the X-axis and the Y-axis is placed on the cut-out center line, and the axis orthogonal to the center line was expressed by the Z-axis. The three-dimensional center-line average roughness (SRa) (µm) was obtained from the following formula:

$$SRa = (1/S_M) \int_0^{LX} \cdot \int_0^{LY} |f(X,Y)| dXdY$$

wherein $LX \cdot LY = S_M$ (B) Three-dimensional 10-point average roughness (SRz)

A portion having a reference area was cut out of a roughness curved line. The interval between the average height of the first to fifth maximum heights and the average depth of the first to fifth maximum depths on the line parallel to the average line of the cut-out portion was input and calculated as SRz (µm).

(8) Number of coarse protuberances

Aluminum was deposited on the surface of the film, and the number of coarse protuberances was measured by using a double beam interference microscope. The number of protuberances showing interference fringes of the third order or higher at a measuring wavelength of 0.54 µm was calculated in terms of the number per 10 $cm^2$.

(9) Abrasion property.

Abrasion properties were evaluated by the following two methods.

(A) Number of depressions on the film surface

Gold was deposited on the surface of the film. The film was photographed by a scanning electron microscope at 2,000 magnifications. The number of depressions formed by drop-off of the tips of protuberances was counted per $mm^2$ of the film surface. The smaller the value, the better.

(B) Amount of white abrasion dust

The film was brought into contact with a fixed pin (6 mm in diameter) plated with hard chromium at a contact angle of 135° and caused to run at a speed of 10 m/min and a tension of 200 g over a length of 1,000 m. The white abrasion dust which adhered to the pin was visually judged in accordance with the following criteria.

A: No adhesion
B: Slight adhesion
C: A small amount of adhesion (larger amount than in Rank B)
D: A large amount of adhesion

(10) Magnetic tape properties 200 parts by weight of fine magnetic powder, 30 parts by weight of a polyurethane resin, 10 parts by weight of nitro-cellulose, 10 parts by weight of a vinyl chloride-cellulose acetate copolymer, 5 parts by weight of lecithin, 100 parts by weight of cyclohexanone, 100 parts by weight of methyl isobutyl ketone and 300 parts by weight of methyl ethyl ketone were mixed and dispersed by a ball mill for 48 hours. Thereafter, 5 parts by weight of a polyisocyanate compound was added to the resultant mixture, thereby obtaining a magnetic coating. The magnetic coating was applied to one side of the polyester film, and magnetically oriented before the coating was sufficiently dried and solidified. Thereafter, the coating was dried to produce a magnetic layer having a thickness of 2 µm.

The thus-coated film was caused to run over a length of 5,000 meters 7 times repeatedly in contact with a 5-stage supercalender composed of mirror-finished metal rolls and polyester composite resin rolls. The roll temperature was 85° C., the linear pressure was 250 kg/cm, and the tape running speed was 80 m/min. The amount of white abrasion dust adhering to the resin roll surface was visually observed and evaluated on the following criteria:

A: Substantially no adhesion of white abrasion dust
B: Very slight adhesion of white abrasion dust
C: Apparently detectable adhesion of white abrasion dust The calendered tape was slit to a width of ½ inch, and the magnetic film obtained was then caused to run at an ordinary speed by using a video deck (Model NV-3700 produced by Matsushita Electric Industrial Co., Ltd.) to evaluate the following magnetic tape properties.

(A) Electromagnetic conversion property (output of VTR head)

The output of the VTR head at a measuring frequency of 4 MHz was measured by a synchroscope and evaluated in comparison with a reference tape (commercially available high-trade video tape) on the following criteria:

A: Equal to the reference tape
B: Slightly inferior to the reference tape
C: Too inferior for practical use (B) Number of dropouts Signals recorded at 4.4 MHz into a video tape were reproduced and the number of dropouts was counted for about 20 minutes by a dropout counter (produced by Okura Industrial Co., Ltd.). Evaluation was made on the following criteria:
A: Good
B: Intermediate
C: Too bad for practical use

(11) Scuff resistance

The base film of the magnetic tape slit to a width of ½ inch was brought into contact with a fixed metal pin having a diameter of 6 mm (3S finish) plated with hard chromium at a contact angle of 135°, a speed of 4 m/min and a tension of 50 g.

Aluminum was then deposited under a vacuum onto the abraded surface to a thickness of about 1,000 Å and the degree of scratching was visually judged in accordance with the following criteria.
1: A great many scratches
2: Many scratches
3: Intermediate between ranks 2 and 4
4: A few scratches
5: No scratches

(12) Running property

The video tape was caused to run for 180 minutes by using a commercially available VBS-type VTR while setting the back tension of the feeding side at zero. The running state of the video tape was observed at the pin immediately before the head cylinder. Evaluation was made on the basis of the distance by which the tape deviated from the right position on the following criteria:
A: The tape deviated from the right position by less than 0.5 mm.
B: The tape deviated from the right position by 0.5 mm to 2 mm.
C: The tape deviated from the right position by more than 2 mm.

(13) Slitting property

A wide coated magnetic tape was cut to a ½ inch width, and the state of the cut face of the magnetic tape was observed under an electron microscope. The sample was marked with A when it was free of turn-up portion, or whiskers or abrasion dust at the cut face; the sample which turn up in the shape of the streak, or in which whisker or abrasion dust is occurred at the cut face, was marked with C; and the sample rated intermediate between A and C was marked with B

EXAMPLE 1

100 parts of dimethyl terephthalate, 60 parts of ethylene glycol and 0.09 part of magnesium acetate tetrahydrate were charged into a reactor and heated to carry out ester exchange reaction, while raising the temperature and distilling off methanol. The reaction temperature was gradually raised to 230° C. in about 4.5 hours after the start of the reaction, whereby the ester exchange reaction was substantially completed.

Thereafter, 1.5 parts of delta-aluminum oxide particles having a primary particle diameter of 0.03 μm (Mohs hardness: 8 to 9) which had been pulverized, classified and filtered in advance were added to the reaction product in the form of an ethylene glycol slurry.

Further, 0.03 part of phosphoric acid and 0.04 part of antimony trioxide were added to the reaction mixture to carry out polycondensation for 4 hours, thereby obtaining a polyester material (1) having an intrinsic viscosity of 0.62.

Separately from this, the same ester exchange reaction and polycondensation were carried out except that no aluminum oxide particles were added, thereby obtaining a polyester material (2) containing substantially no inert particles and having an intrinsic viscosity of 0.62.

In addition, the same ester exchange reaction was carried out except that 1.0 part of vaterite-type ellipsoidal calcium carbonate particles which had been surface-treated with polycarboxylic acid (3 wt % based on the particles) and which had an average particle diameter ($d_{50}$) of 0.22 μm, a specific surface area (S) of 19.4 m$^2$/g and an aspect ratio of 1.50 were used in place of the aluminum oxide particles.

Thereafter, 0.03 part of phosphoric acid and 0.04 part of antimony trioxide were added to the reaction mixture to carry out polycondensation for 4 hours, thereby obtaining a polyester material (3) having an intrinsic viscosity of 0.60. From the observation of the polyester (3) through a microscope, the particles were confirmed to be uniformly dispersed.

The polyester materials (1), (2) and (3) were blended in the weight ratio of 16: 4 : 80 to obtain a polyester material (4).

The polyester materials (2) and (3) were blended in the weight ratio of 40 : 60 to obtain a polyester material (5).

After the polyester materials (4), (2) and (5) were crystallized in advance separately from each other, they were dried by an ordinary method and coextruded by different melt extruders, so that the layer (A) was composed of the polyester material (4), the inner layer in the layers (B) was composed of the polyester material (2), and the outer layer in the layers (B) was composed of the polyester material (5), thereby producing an amorphous sheet of three layers. The thickness ratio of the layer (A), the inner layer in the layers (B) and the outer layer in the layers (B) was 10 : 80 : 10. The surface of the layer (A) constituted the surface (A) and the surface of the outer layer in the layers (B) constituted the surface B.

The amorphous sheet obtained was stretched in the machine direction at a temperature of 93° C. to 3.5 times, and in the transverse direction at a temperature of 110° C. to 3.5 times, and thereafter heat-set at a temperature of 220° C. for 3 seconds to obtain a film of 15 μm in thickness.

The intrinsic viscosity of the film was 0.59, the refractive index ($n\alpha$) of the film in the direction of thickness was 1.4 97, and the birefrigerence ($\Delta n$) was 0. 037.

A magnetic layer was applied to the surface (B) of the film to produce a magnetic film, and the properties thereof were evaluated.

EXAMPLE 2

The same ester exchange reaction as in the production of the polyester material (1) in Example 1 was carried out except that 1.0 part of vaterite-type ellipsoidal calcium carbon particles which had been surface-treated with polycarboxylic acid (3 wt % based on the particles) and which had an average particle diameter ($d_{50}$) of 0.45 μm, a specific surface area (S) of 9.1 m$^2$/g and an aspect ratio of 1.05 were used in place of aluminum oxide particles.

Thereafter, 0.03 part of phosphoric acid and 0.04 part of antimony trioxide were added to the reaction mixture to carry out polycondensation for 4 hours, thereby obtaining a polyester material (6) having an intrinsic viscosity of 0.60. From the observation of the polyester (6) through a microscope, the particles were confirmed to be uniformly dispersed.

The polyester materials (4) and (2) were blended in the weight ratio of 10 : 90 to obtain a polyester material (7).

The polyester materials (2) and (6) were blended in the weight ratio of 70 : 30 to obtain a polyester material (8).

After the polyester materials (4), (7) and (8) were crystallized in advance separately from each other, they were dried by an ordinary method and coextruded by different melt extruders, so that the layer (A) was composed of the polyester material (4), the inner layer in the layers (B) was composed of the polyester material (7), and the outer layer in the layers (B) was composed of the polyester material (8), thereby producing an amorphous sheet of three layers. The thickness ratio of the layer (A), the inner layer in the layers (B) and the outer layer in the layers (B) was 10 : 80: 10. The amorphous sheet obtained was biaxially stretched and heat-set in the same way as in Example 1 to obtain a film of 15 μm in thickness.

The intrinsic viscosity of the film was 0.59, the refractive index (nα) of the film in the direction of thickness was 1.496, and the birefrigence (Δn) was 0.038.

A magnetic layer was applied to the surface (B) of the film to produce a magnetic film, and the properties thereof were evaluated.

COMPARATIVE EXAMPLE 1

A single-layered amorphous sheet [layer (A)] was produced by using the polyester material (4) used in Example 1. One side of the film constituted the surface (A) and the other the surface (B). The amorphous sheet obtained was biaxially stretched and heat-set in the same way as in Example 1 to obtain a film of 15 μm in thickness. A magnetic layer was applied to the surface (B) of the film to produce a magnetic film, and the properties thereof were evaluated.

EXAMPLE 3

A two-layered film was obtained by using the polyester materials used in Examples 1 and 2 in the same way as in Example 1 except that the concentrations of the particles and the thicknesses of the layers were changed as shown in Table 1. The properties of the film and the magnetic tape were evaluated.

The intrinsic viscosity of the film was 0.59, the refractive index (nα) of the film in the direction of thickness was 1.497, and the birefrigence (Δn) was 0.038.

COMPARATIVE EXAMPLE 2

Three-layered sheets were obtained by using calcite-type block calcium carbon particles obtained by synthesis and having an average particle diameter of 0.70 μm, and a particle-size distribution of 2.05, so as to have concentrations shown in Table 2. The amorphous sheets were stretched in the same way as in Example 1. The thickness ratio of the layer (A), the inner layer in the layers (B) and the outer layer in the layers (B) was 10 : 80 : 10. The properties of the films and the magnetic tapes were evaluated.

The intrinsic viscosity of the film in Comparative Example 2 was 0.59, the refractive index (nα) of the film in the direction of thickness was 1.497, and the birefrigerence (Δn) was 0.036.

The properties of the films were evaluated.

COMPARATIVE EXAMPLE 3

A two-layered amorphous sheet was produced by using the polyester materials used in Examples 1 and 2 in the same way as in Example 1 except that the concentrations of the particles and the thicknesses of the layers were changed as shown in Table 2. The properties of the film and the magnetic tape were evaluated.

The intrinsic viscosity of the film was 0.59, the refractive index (nα) of the film in the direction of thickness was 1.497, and the birefrigerence (Δn) was 0.037.

COMPARATIVE EXAMPLE 4

A film was produced in the same way as in Comparative Example 3 except that flat kaolin particles having an average particle diameter of 0.45 μm and a particle-size distribution of 2.55 were used and the concentrations of the particles were changed as shown in Table 2. The properties of the film and the magnetic tape were evaluated.

The intrinsic viscosity of the film was 0.58, the refractive index (nα) of the film in the direction of thickness was 1.497, and the birefrigerence (Δn) was 0.039.

The results obtained are shown in Tables 1 and 2.

TABLE 1

| | Example 1 Three layers | Example 2 Three layers | Example 3 Two layers | Comparative Example 1 Single layer |
|---|---|---|---|---|
| <Mixed particles> | | | | |
| [A layer] | | | | |
| Alumina concentration (wt %) | 0.24 | 0.24 | 0.24 | 0.24 |
| Calcium carbonate concentration (wt %) | 0.80 | 0.80 | 0.80 | 0.80 |
| [B layer] | | | | |
| (Inner layer) | | | | |
| Alumina concentration (wt %) | 0 | 0.02 | — | — |
| Calcium carbonate concentration (wt %) | 0 | 0.08 | — | — |
| (Outer layer) | | | | |
| Alumina concentration (wt %) | 0 | 0 | 0 | — |
| Calcium carbonate concentration (wt %) | 0.60 | 0.30 | 0.30 | — |
| [Whole layers] | | | | |
| Alumina concentration (wt %) | 0.02 | 0.02 | 0.02 | 0.24 |
| Calcium carbonate concentration (wt %) | 0.14 | 0.11 | 0.35 | 0.80 |
| <Film Properties> | | | | |
| $SRa^A$ (μm) | 0.014 | 0.014 | 0.014 | 0.014 |
| $SRz^A/SRa^A$ | 8.3 | 8.2 | 8.2 | 8.4 |
| $SRa^B$ (μm) | 0.010 | 0.010 | 0.010 | 0.010 |
| Slittability | A | A | A | B |
| Abrasion resistance of surface (A) | | | | |
| Number of depressions | 4 | 4 | 4 | 4 |
| Amount of abrasion dust | A | A | A | A |
| <Magnetic tape properties> | | | | |
| Dust on calender | ○ | ○ | ○ | ○ |
| S/N (dB) | +0.4 | +0.5 | +0.4 | +0.3 |
| Dropouts (number/min) | 2.7 | 2.0 | 2.7 | 2.9 |
| Scratch durable of | 5 | 5 | 5 | 5 |

TABLE 1-continued

|  | Example 1 Three layers | Example 2 Three layers | Example 3 Two layers | Comparative Example 1 Single layer |
|---|---|---|---|---|
| surface (A) |  |  |  |  |
| Running property of surface (A) | A | A | A | A |
| Cutting property | A | A | A | A |

TABLE 2

|  | Comparative Example 2 Three layers | Comparative Example 3 Two layers | Comparative Example 4 Two layers |
|---|---|---|---|
| <Mixed particles> |  |  |  |
| [A layer] |  |  |  |
| Alumina concentration (wt %) | 0.40 | 0.24 | 0 |
| Calcium carbonate concentration (wt %) | 0.30 | 0.50 | Kaolin (0.50) |
| [B layer] |  |  |  |
| (Inner layer) |  |  |  |
| Alumina concentration (wt %) | 0.04 | — | — |
| Calcium carbonate concentration (wt %) | 0.03 | — | — |
| (Outer layer) |  |  |  |
| Alumina concentration (wt %) | 0.40 | 0 | — |
| Calcium carbonate concentration (wt %) | 0.30 | 0.30 | — |
| [Whole layers] |  |  |  |
| Alumina concentration (wt %) | 0.11 | 0.02 | 0 |
| Calcium carbonate concentration (wt %) | 0.08 | 0.32 | Kaolin (0.50) |
| <Film Properties> |  |  |  |
| $SRa^A$ (μm) | 0.019 | 0.016 | 0.017 |
| $SRz^A/SRa^A$ | 18.4 | 18.0 | 18.8 |
| $SRa^B$ (μm) | 0.019 | 0.010 | 0.012 |
| Slittability | C | A | A |
| Abrasion resistance of surface (A) |  |  |  |
| Number of depressions | 24 | 73 | 94 |
| Amount of abrasion dust | A | A-B | B-C |
| <Magnetic tape properties> |  |  |  |
| Dust on calender | ○ | ○ | △ |
| S/N (dB) | +0.0 | +0.1 | −1.1 |
| Dropouts (number/min) | 2.9 | 10.2 | 18.4 |
| Scratch durable of surface (A) | 5 | 4 | 1 |
| Running property of surface (A) | B-C | A | B-C |
| Cutting property | A | B | A |

As is obvious from Examples and Comparative Examples, a biaxially oriented laminated film of the present invention comprising the polyester layer (A) which contains a specified amount of specific inorganic particles (a) and a specified amount of specific inorganic particle (b) and which has the characteristics specified by the present invention and the polyester layer (B) which has the characteristics specified by the present invention is excellent in the slittability, and shows a very small amount of abrasion dust. The number of depressions on the film caused by drop-off of particles is not more than 20/mm². When the film is manufacture into a magnetic tape, the number of dropouts is not more than 5/min, and it has excellent running property and scuff resistance. All the conditions designated in the present invention such as the properties and the amount of inorganic particles and the properties of the film are essential, and it is impossible to produce a magnetic tape having excellent characteristics with any one of them unsatisfied.

What is claimed is:

1. A biaxially oriented laminated polyester film for magnetic recording media comprising a polyester layer (A) and a polyester layer (B) laminated on said polyester layer (A) and wherein polyester layer (A) contains inorganic particles (a) having a Mobs hardness of not less than 7 and an average particle diameter of 0.005 to 0.5 μm and inorganic particles (b) having a Mobs hardness of less than 7, a particle-size distribution ($d_{25}/d_{75}$) of not more than 2.00, an aspect ratio (major axial diameter/minor axial diameter) of 1.0 to 2.0, a specific surface area (S) of 1.6 to 40 m²/g and an average particle diameter ($d_{50}$) of 0.05 to 1.0 μm, and the product (S×$d_{50}$) of the specific surface area and the average particle diameter of 2.4 to 7.0; and the content of said inorganic particles (a) being 0.15 to 1.0 wt % based on the polyester content in said layer (A) and not more than 0.10 wt % based on the total polyester content in said layers (A) and (B), the content of said inorganic particles (b) being 0.10 to 2.0 wt % based on the polyester content in said layer (A) and not more than 0.4 wt % based on the total polyester content in said layers (A) and (B), and said biaxially oriented laminated film satisfying the following expression (1) to (4):

$$0.005 \leq SRa^A \leq 0.045 \quad (1)$$

$$4 \leq SRz^A/SRa^A \leq 13 \quad (2)$$

$$0.002 \leq SRa^B \leq 0.020 \quad (3)$$

$$1.1 \leq SRa^A/SRa^B \leq 4.0 \quad (4)$$

wherein $SRa^A$ represents the three-dimensional center-line average roughness (μm) of said layer (A), $SRz^A$ represents the three-dimensional 10-point average roughness (μm) of the surface of said layer (A), and $SRa^B$ represents the three-dimensional center-line average roughness (μm) of said layer (S).

2. A biaxially oriented laminated polyester film for magnetic recording media according to claim 1, wherein said inorganic particles (a) are aluminum oxide particles having an average particle diameter of 0.05 to 0.3 μm, and the content thereof is 0.15 to 0.50 wt % based on the polyester content in said layer (A) and not more than 0.075 wt % based on the total polyester content in said layers (A) and (B).

3. A biaxially oriented laminated polyester film for magnetic recording media according to claim 1, wherein said inorganic particles (b) are vaterite calcium carbonate particles having a particle-size distribution ($d_{25}/d_{75}$) of not more than 1.80, an aspect ratio (major axial diameter/minor axial diameter) of 1.2 to 1.8, a specific surface area (S) of 3.0 to 6.0 m²/g, an average particle diameter ($d_{50}$) of 0.1 to 0.7 μm, and the product ($S \times d_{50}$) of the specific surface area and the average particle diameter of 3.0 to 6.0, and the content thereof (b) is 0.2 to 1.8 wt % based on the polyester content in said layer (A) and not more than 0.075 wt % based on the total polyester content in said layers (A) and (B).

4. A biaxially oriented laminated polyester film for magnetic recording media according to claim 1, wherein the $SRa^A$ is 0.007 to 0.030 μm, the $SRz^A/SRa^A$ is 5 to 10, the $SRa^B$ is 0.008 to 0.015 μm and the $SRa^A/SRa^B$ is 1.1 to 3.0.

5. A biaxially oriented laminated polyester film for magnetic recording media according to claim 1, wherein the thickness of said layer (A) is 3 to 30% of the total thickness of said film.

6. A biaxially oriented laminated polyester film for magnetic recording media according to claim 1, wherein the number of coarse protuberances having a height of not less than 1.08 μm on the surface of said layer (A) is not more than 100 per cm², the refractive index of said film in the direction of thickness is not less than 1.492, the difference ($\Delta n = n_{TD} - n_{MD}$) between the refractive index ($n_{TD}$) in the transverse direction and the refractive index ($n_{MD}$) in the machine direction of said film is not less than 0.020, and the intrinsic viscosity ($\eta$) is 0.52 to 0.62.

7. A biaxially oriented laminated polyester film for magnetic recording media according to claim 1, wherein said particles (a) are aluminum oxide particles and said particles (b) are vaterite calcium carbonate particles.

* * * * *

UNITED STATES PATENT AND TRADEMARK OFFICE
CERTIFICATE OF CORRECTION

PATENT NO. : 5,429,855
DATED : July 4, 1995
INVENTOR(S) : Tomoyuki KOTANI et al.

It is certified that error appears in the above-indentified patent and that said Letters Patent is hereby corrected as shown below:

Column 20, lines 14 and 16, Claim 1, contains a typographical error wherein "Mobs" should read --Mohs--; Column 20, line 52, Claim 1, "(S)" should read --(B)--.

Column 22, line 3, Claim 6, "per cm$^2$" should read --per 25 cm$^2$--.

Signed and Sealed this

Twenty-seventh Day of February, 1996

Attest:

BRUCE LEHMAN

*Attesting Officer*   *Commissioner of Patents and Trademarks*